Oct. 31, 1939.     W. J. TAYLOR     2,178,525
PORTABLE HANDLE STICK GRIPPING MECHANISM
Filed July 10, 1937
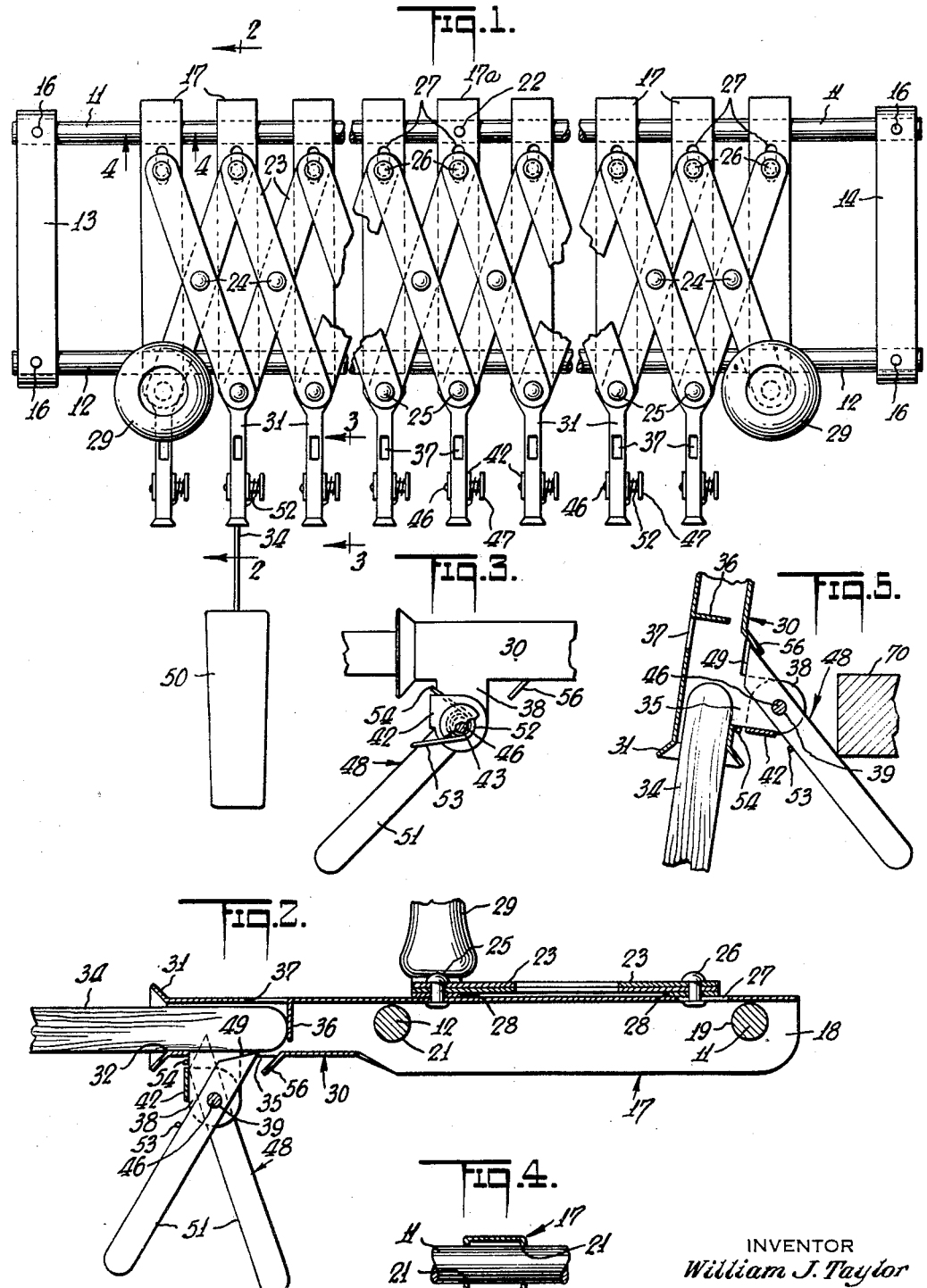
INVENTOR
William J. Taylor
BY
ATTORNEY Patented Oct. 31, 1939

2,178,525

UNITED STATES PATENT OFFICE 2,178,525

PORTABLE HANDLE STICK GRIPPING MECHANISM

William J. Taylor, Syracuse, N. Y., assignor to Joe Lowe Corporation, New York, N. Y., a corporation of Delaware Application July 10, 1937, Serial No. 152,904

4 Claims. (Cl. 91—60)

The invention relates generally to improvements in apparatus for simultaneously receiving, locking, manipulating and releasing a plurality of spaced handle members, such as the wooden handle sticks protruding from edible stick confectionery products, including candy, frozen water-ice, ice cream or the like, and it has particular relation to a portable stick gripping mechanism which is capable of receiving and locking a plurality of such confectionery products therein by means of the protruding ends of their respective handle sticks for manipulation and transportation, as desired, and, if the same are to be coated, for separating the same in a regular spaced relationship to facilitate the application of the coating material and drying.

The present invention is an improvement in the devices shown and described in United States Letters Patent No. 1,809,190, issued June 9, 1931, to Robert F. Brimer, and No. 1,924,224, issued August 29, 1933, to John W. West. Inasmuch as these prior patents clearly show and describe the various methods employed in the manufacture of such confectionery products, and also explain in detail the various operations and advantages of employing apparatus of the character to be described herein, it is believed that further explanation of these manufacturing processes, together with the various operations wherein the present invention may be advantageously employed, may be dispensed with by merely referring the reader to said aforementioned Letters Patent.

An object of the present invention is to provide a portable adjustable article handling apparatus of an improved construction which is simple and inexpensive to make, exceedingly light in weight, and having a minimum of moving parts.

A further object of the invention is the provision of a portable apparatus of the character described which is provided with a plurality of spaced handle receiving units having individual gripping means adapted to function and operate separately and apart from the gripping means of the other units of the apparatus.

A further object of the invention is to provide a portable article handling apparatus of the character described having a plurality of spaced handle receiving units equipped with individual gripping means which, while intended to function and operate separately, are capable of being operated also as a single unit.

Another object of the invention is the provision of a portable article handling apparatus of the character described having a handle receiving unit provided with an automatic handle gripping mechanism.

A further object of the invention is to provide a portable article handling device having a plurality of spaced handle receiving units with gripping means that is automatically moved into gripping position by the insertion of the handle member to be gripped into said receiving unit.

Another object of the invention is the provision of a portable article handling apparatus having a plurality of spaced handle receiving units with individually operable gripping means that is automatically moved into gripping position by the insertion of the handle member therein.

Other and further objects and advantages of the invention will be apparent from the following description, wherein a preferred form of embodiment is shown, reference being had to the accompanying drawing forming a part thereof, in which:

Fig. 1 is a fragmentary side elevational view of a device constructed in accordance with my invention, the same illustrating the manner in which the protruding end of a handle stick of a confectionery product is secured therein;

Fig. 2 is an enlarged cross-sectional view of the apparatus shown in Fig. 1, the same being taken along the line 2—2 thereof, looking in the direction of the arrows, and also illustrating the normal position of the gripping mechanism;

Fig. 3 is a fragmentary side view of one of the article receiving units shown in Fig. 1, the same being taken along the line 3—3 thereof, looking in the direction of the arrows;

Fig. 4 is an enlarged cross-sectional view of the apparatus shown in Fig. 1, the same being taken along the line 4—4 thereof, looking in the direction of the arrows; and Fig. 5 is a fragmentary cross-sectional view, on an enlarged scale, of one of the handle receiving units, illustrating one method of releasing the handle members simultaneously by placing the projecting arm of the gripping mechanism against a straight edge or table.

Referring now to the drawing, there is shown a rigid rectangular metal frame structure consisting of spaced parallel stationary guide rods 11 and 12, which are fixedly joined at their opposite ends by connecting links 13 and 14 suitably riveted thereto, as indicated at 16. A plurality of arms 17, which are of channel-like construction preferably to reduce their weight, are provided with aligned openings 19 and 21 in their sides 18 adjacent the opposite ends thereof. It will be noted that the aligned openings 19 of the arms 17 receive the top guide rod 11, and that the correspondingly aligned openings 21 at the opposite ends of the arms 17 receive the bottom guide rod 12, the arms 17 thereby being slidably mounted transversely of the stationary guide rods 11 and 12, except, however, for one of the intermediate arms 17—a, which is riveted or keyed to the center of the rod 11, as indicated at 22, for reasons to be hereinafter explained.

To properly adjust the spacing of the arms 17 at equal intervals and to effect simultaneous separation of the same, a pantograph or lazy tong arrangement is provided for the arms 17. This lazy tong arrangement is made up of a plurality of crossed links 23 pivotally connected together, as indicated at 24, the lower extremities of each link being pivotally secured by rivets to the lower portion of the arms 17, as indicated at 25, the opposite ends of the links 23 being slidably secured by rivets to the upper extremities of the arms 17, as indicated at 26, slots 27 being provided in the arms 17 to permit reciprocable sliding action. Spacing washers 28 are mounted on the rivets 26 between the arms 17 and the links 23, as best shown in Fig. 2.

To effect the variation of the distance between the several arms 17 through this pantograph or lazy tong system of links 23, one of the intermediate arms 17—a is fixedly secured centrally of the rod 11, as indicated at 22, and the extreme outer end arms 17 are provided with handles 29 projecting outwardly therefrom and transversely of the portable carrier. These handles 29 not only afford a convenient means of operating the lazy tong system of links 23 but also afford means for carrying the entire portable apparatus. Thus, it will be apparent that the lazy tong system of links 23 is anchored centrally of the frame structure on the guide rod 11, and that the handles 29 provide means for manipulating the free ends thereof toward and away from the anchored arm 17—a. By such movement the arms 17 are simultaneously and equally spaced along the stationary rods 11 and 12, the variation of the spacing being accomplished by the distance the opposite free end arms 17 are moved toward and away from the centrally anchored arm 17—a.

Mounted on the lower end of the arms 17 are handle receiving units 30, having outwardly flared funnel-like mouths 31 to facilitate insertion of the handle members to be received thereby. In the present embodiment these units 30 are shown as being integrally formed with the lower ends of the arms 17 by reducing the same to provide a narrow rectangular recess or socket receiving passageway 32. Obviously, the shape of the handle receiving unit 30 depends on the shape of the handle member intended to be manipulated thereby. The present units are shown to be of narrow rectangular shape in order to correspond to the shape of the flat handle members 34 to be manipulated thereby, but it is to be understood that if a round handle member was to be manipulated a round correspondingly shaped handle receiving unit should be formed on the arms 17 and 17—a, the shape forming no part of the invention.

The handle receiving units 30 are provided with limit stops 36, which are merely a portion of the end walls of the units 30 struck out and bent inwardly of the recessed passageway 32, as indicated at 37, to provide an obstruction for preventing insertion of the handle members 34 beyond a certain point, as best shown in Fig. 2. The stops 36 prevent the handle members 34 from being positioned in the portable holder beyond a certain depth, thereby assuring that the projecting confectionery bodies on the opposite ends thereof are in proper and regular alignment, which becomes of extreme importance in the dipping and/or coating operation. If the confectionery bodies were not all evenly aligned during the dipping and coating operation, one product may receive coating material half-way up the projecting end of the hand stick 34 while the adjacent product, if projecting further away from the receiving units 30, may not be entirely coated. Therefore, regularity in the positioning of the handle members in the individual gripping units 30 is required.

A longitudinal opening 35 is provided in the end wall of the handle receiving units 30 opposite the opening 37 which was formed to provide the stop 36. Outwardly projecting and integrally formed ears 38, having aligned openings 39 adjacent the outer ends thereof, are mounted on opposite sides of the opening 35. A U-shaped plate 42, provided with aligned openings 43, is positioned around the front side of the projecting ears 38 to provide a forward stop or abutment for the pivotal latch gripping mechanism. The openings 39 and 43 are in perfect alignment when the U-shaped plate 42 is positioned around the projecting ears 38, and a pin 46, having an enlarged head 47 at one end thereof, is secured through the aligned openings 39 and 43 with the head 47 spaced from the side of the plate 42. The pin 46 secures the U-shaped plate 42 in position on the ears 38 and provides a shaft for the latch gripping mechanism.

The latch gripping mechanism consists of a member 48 pivotally mounted on the shaft 46 between the projecting ears 38, having a beveled and pointed gripping end 49 extending into the passageway 32 of the handle receiving units 30, and an oppositely and outwardly projecting arm 51. A coil spring 52 is mounted on the shaft 46 between the side of the cover plate 42 and the enlarged head 47, having one end soldered to the latch member 48, as indicated at 53, and the other end soldered to the front edge of the adjacent projecting ear 38, as indicated at 54. The spring 52 maintains the pointed gripping end 49 of the member 48 normally within the passageway 32 and adjacent the front portion of the U-shaped cover plate 42, the latter acting as a stop for the forward spring urging movement of the gripping latch member 48. A second stop 56 is provided adjacent the back end of the opening 35, the same being bent outwardly to permit the pointed gripping end 49 of the member 48 to be moved entirely out of the passageway 32 of the handle receiving unit 30 when a handle member 34 is inserted therein. The stop 56 also limits the backward movement of the pivotal latch gripping member 48 to prevent the same from being pushed entirely out of the opening 35.

The operation of the apparatus should be apparent from the foregoing description, and may be briefly summarized as follows: The apparatus, being portable, is endeavored to be transported and manipulated by means of the handles 29, and, when the arms 17 are juxtaposed centrally on the rods 11 and 12, the spacing of the funnel-like mouths 31 of the handle receiving units 30 are proper to receive a plurality of correspondingly spaced handle sticks 34, either from a mold or from a cutting machine carriage (neither of which is shown). However, the loading of apparatus may be done manually, if desired, by merely inserting the protruding ends of the handle sticks into the passageways 42 of the units 30, whereupon they automatically become securely fastened therein until manually released.

When the protruding end of a handle stick 34 of a confectionery product 50 is inserted through the funnel-like mouth 31 and into the passageway 32 of the receiving unit 30, the forward end of the handle member 34 forces the beveled pointed gripping end 49 backwardly against the stop 56, as best shown in Fig. 5, and passes there-beyond until it contacts and abuts the stop 36. The spring urging means 52, against which the pointed gripping end 49 has been forced, tends to pull the pointed end 49 forwardly, and this, together with any forward pull on the handle stick 34 either due to manual or gravitational forces, causes the pointed end 49 to become imbedded in the handle member 34, thereby firmly and positively locking the same within the receiving unit 30, as best shown in Fig. 2. In order to release the handle member 34 from the gripping point 49, it is necessary to force the gripping point 49 backwardly against its spring urging means 52 until it is entirely out of the passageway 32 and against the stop 56. This backward movement of the pointed end 49 may be accomplished by exerting pressure on the top edge of the outwardly projecting arm 51 of the latch member 48. Since each of the receiving units 30 is provided with individual operating gripping members 48, which automatically grab and hold the handle sticks 34 when the same are positioned in the receiving units 30, it is obvious that any number or group of confectionery articles may be released without affecting the remainder of the articles being held in the carrier. The releasing of the products may be effected manually by merely pulling the projecting arm 51 downwardly, or, if it is desirable to release all of the products, or a group of them, simultaneously, the same can be readily accomplished by merely striking the top sides of the projecting arms 51 against a straight edge 70, as best shown in Fig. 5, which may be a bar, or the edge of a table, etc.

Although I have only described in detail one form which my invention may assume, it will be apparent to those skilled in the art that the invention is not so limited, but that various modifications may be made therein without departing from the spirit thereof or from the scope of the appended claims.

What I claim is:

1. In a portable article handling device of the character described, a frame structure including a pair of spaced parallel stationary rods, a plurality of arms slidably mounted transversely of said rods, means connecting said arms together for adjustable lateral movement along said rods, and a handle receiving unit mounted on the projecting ends of each of said arms for releasably securing one end of a handle member in spaced relation to said frame structure, said unit having a longitudinally extending passageway open only at its outward end for receiving one end of a handle member, said unit having a pivotal latch member mounted intermediate its ends having a locking end that normally extends within and blocks said passageway, said locking member being movable into engaging and locking position by insertion of said handle member for engaging and releasably securing the handle member therein, and a free end that extends outwardly and away from said unit for withdrawing the locking end from said passageway to release the handle member for said handle receiving unit.

2. In a portable article handling device of the character described, a frame structure including a pair of spaced parallel stationary rods, a plurality of arms slidably mounted transversely of said rods, means connecting said arms together for adjustable lateral movement along said rods, and independently operable handle receiving units mounted on the projecting ends of each of said arms for releasably securing one end of a handle member in spaced relation to said frame structure, said unit having a longitudinally extending passageway open only at its outward end for receiving one end of a handle member, said unit having a pivotal latch member mounted intermediate its ends having a locking end that normally extends within and blocks said passageway, said locking member being movable into engaging and locking position by insertion of said handle member for engaging and releasably securing the handle member therein, and a free end that extends outwardly and away from said unit for withdrawing the locking end from said passageway to release the handle member from said handle receiving unit.

3. In a portable article handling device of the character described, a frame structure including a pair of spaced parallel stationary rods, a plurality of arms slidably mounted transversely of said rods, means connecting said arms together for adjustable lateral movement along said rods, and independently operable handle receiving units mounted on the projecting ends of each of said arms for releasably securing one end of a handle member in spaced relation to said frame structure, said unit having a longitudinally extending passageway open only at its outward end for receiving one end of a handle member, said unit having a spring urged pivotal latch member mounted intermediate its ends having a locking end that normally extends within and blocks said passageway, said locking member being movable into engaging and locking position by insertion of said handle member for engaging and releasably securing the handle member and a free end that extends outwardly and away from said unit for withdrawing the locking end from said passageway to release the handle member from said handle receiving unit.

4. In a portable article handling device of the character described, a frame structure including a pair of spaced parallel stationary rods, a plurality of arms slidably mounted transversely on said rods, means connecting said arms together for adjustable lateral movement along said rods, and a handle receiving unit mounted on the projecting ends of each of said arms for releasably securing one end of a handle member in spaced relation to said frame structure, said unit having a longitudinally extending passageway open only at its outer end for receiving one end of a handle member, a latch member pivotally mounted adjacent said passageway having a relatively short locking end which is adapted to extend within said passageway and a relatively long free arm which extends outwardly and away from said unit, means for urging said short arm normally within said passageway for engaging and securing said handle member when the same is positioned therein, means for preventing the withdrawal of said locking end from said unit when pressure is exerted on said free arm against said urging means for withdrawing said locking arm from said passageway to effect a release of the handle member.

WILLIAM J. TAYLOR.